United States Patent [19]
Matsuki

[11] 3,870,351
[45] Mar. 11, 1975

[54] THREADED TUBE JOINT STRUCTURE FOR CASING, PARTICULARLY OIL WELL TUBING

[75] Inventor: Norio Matsuki, Osaka, Japan

[73] Assignee: Sumitomo Metal Industries Limited, Osaka, Japan

[22] Filed: Mar. 30, 1973

[21] Appl. No.: 346,302

[30] Foreign Application Priority Data
Mar. 31, 1972 Japan.......................... 47/32953

[52] U.S. Cl.................. 285/334, 285/351, 403/343
[51] Int. Cl........................ E21b 17/08, F16l 15/00
[58] Field of Search .......... 285/333, 334, 351, 355, 285/DIG. 10, 332.2; 403/343

[56] References Cited
UNITED STATES PATENTS

| 2,258,066 | 10/1941 | Oyen............................... 285/334 X |
| 2,893,759 | 7/1959 | Blose ................................ 285/334 |
| 2,992,019 | 7/1961 | MacArthur..................... 285/334 X |
| 3,024,047 | 3/1962 | Schmohl..................... 285/DIG. 10 |
| 3,467,413 | 9/1969 | Madrelle............................. 285/332.2 |

FOREIGN PATENTS OR APPLICATIONS

| 663,403 | 5/1964 | Italy.................................... 285/334 |
| 1,220,856 | 1/1971 | Great Britain...................... 285/334 |

*Primary Examiner*—Werner H. Schroeder
*Assistant Examiner*—Moshe I. Cohen
*Attorney, Agent, or Firm*—Watson, Cole, Grindle & Watson

[57] ABSTRACT

A threaded tube joint structure for casing, particularly oil well tubing, which is more perfect in the sealing performance than any other joint. This sealing performance is obtained with a first metal-to-metal contact seal between the outer surface of a lip of a male threaded member and a corresponding inner surface of a female threaded member and a second metal-to-metal contact seal between the end face of the lip and a corresponding face of the female threaded member. This structure permits the realization of the intended alignment of the reference axes of the abutting faces of the second seal because these faces resist deviation from their fixed positions relative to each other.

7 Claims, 8 Drawing Figures

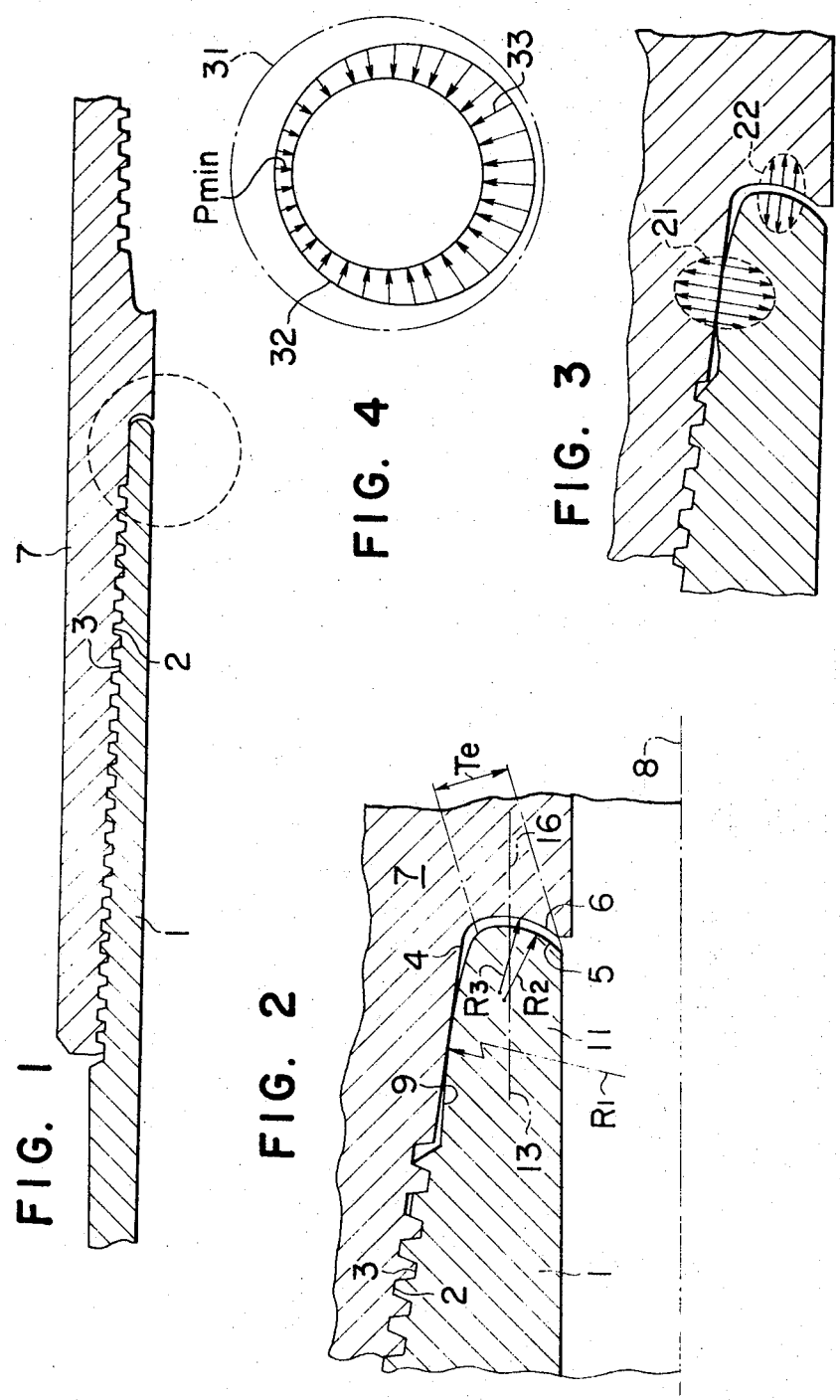

THREADED TUBE JOINT STRUCTURE FOR CASING, PARTICULARLY OIL WELL TUBING

This invention relates to threaded connections for tubular products such as are extensively used in the oil and gas industry in connection with the exploitation of underground deposits of natural resources such as oil and gas.

The conditions under which tubing is used and the requirements of such tubing have been getting progressively severe through the years. Natural oil and gas wells currently being driven have extended to depths in excess of 5,000 meters. The type of the thread of tubular products employed for such wells has undergone changes through many years and various new types of threaded joints have been proposed and actually used. It will be understood that in a string of tubing extending to a depth in excess of 5,000 meters, the uppermost tube joint must withstand the total weight of the tubing even through no external force is exerted and the tubing is simply suspended. Since the ordinary tubing commonly used today weighs from 6 to 50 kilograms per one meter of the tubing length, the tremendous loads which must be carried by the threads will be appreciated. If the tubing is also used for the purpose of drilling the well, the coupling must be able to withstand high torque load in addition to the tensile load.

One difficulty encountered with tubing is that when it is subjected to a great axial tension load, the coupling between mating threaded elements tends to become loose, adversely affecting the leak-tight property of the coupling. Therefore, improvements in connection with the seal of threaded tube joints have been desired.

It has been known and is disclosed, for instance, in U.S. Pat. No. 3,210,096 and U.S. Pat. No. 3,224,799 to seal against leakage between mating threaded elements, i.e., through the threaded tube joint, by providing upon make-up of the coupling a metal-to-metal seal with interfitting or interengaging faces of male and female threaded elements of the coupling. In this joint structure, the end face of the end portion (or lip) of the male or female threaded element constitutes the metal-to-metal seal line in a plane normal to the normal tubing axis, with the mating face of the latter element serving as a stop shoulder to prevent excessive make-up. It is also known and disclosed, for instance, in British Patent specification No. 1,220,856, U.S. Pat. No. 3,489,437, U.S. Pat. No. 3,359,013 and U.S. Pat. No. 3,050,318 to make the end face of the male element a concave frusto-conical surface including the tubing axis and the mating face of the female element a convex frusto-conical surface so that the convex face of the female element acts to enlarge the concave face of the male member depending upon the magnitude of the make-up force. Further, it is known and disclosed, for instance, in U.S. Pat. No. 2,992,019 and British Patent specification No. 1,220,856 to form upon make-up of the joint a metal-to-metal seal between a conical pin surface of the lip of a male threaded member and the corresponding conical box surface of a female member, either one of the interengaging surfaces having a straight profile and the other having an arcuate profile.

However, in these known threaded joint structures the end face of the male threaded member and the mating face of the female threaded member either lie in a plane normal to the tubing axis or in a conical surface including the tubing axis. Therefore, the contact pressure obtainable by interengaging these surfaces is relatively low and tends to be insufficient even if these surfaces are urged against each other with a very strong make-up force because the contact obtainable is no other than an area contact. Such low contact pressure at the end of the male threaded member is insufficient to seal against leakage of fluid. Also, it is hardly expected to obtain the designed alignment of the end face of the male threaded member and the mating face of the female threaded member by the mere make-up of the joint. Since uniform sealing pressure over the metal-to-metal seal is not ensured and nonuniform distribution of the sealing pressure is anticipated, it is very likely that leakage will occur in a low sealing pressure zone. It is also well known in the art that in order to ensure leakage-tightness against oil and natural gas with a threaded coupling provided with a metal-to-metal seal, it is necessary to have a uniform sealing pressure over the entire seal line and that the sealing pressure should be higher than the pressure of the fluid to be sealed against. Thus, it is very important that the sealing pressure is uniform over the entire seal line and sufficiently high. Further, an excessively high local sealing pressure is undesirable because it is prone to cause seizure of metal surfaces due to friction, thus leading to leakage. Accordingly, it is desired to be able to correct circumferential distribution of the sealing pressure so as to render it uniform. If this can be done, a most effective seal both with respect to the prevention of seizure and to the fluid-tightness can be obtained.

With the above considerations in mind, in the present invention a particular importance is attached to the coaction of the end face of the male threaded member and mating face of the female threaded member and to the shape or profile of the metal-to-metal contact surfaces.

In accordance with the invention, a first metal-to-metal contact seal is formed upon make-up of the joint between an outer surface of a thread-free end portion or lip of the male threaded member and a corresponding inner surface of the female threaded member, the outer surface of the lip extending forwardly of the forward end of the thread and being substantially spherical or having a substantially arcuate profile and the corresponding inner surface of the female threaded member having a straight or convex profile. At the same time, a second metal-to-metal contact seal is formed between the end face of the lip of the male member and a corresponding face of the female member, the end face of the lip substantially having a profile of a convex or concave surface of revolution and the corresponding face of the female member having a profile substantially complementary to that of the mating end face of the male member so that an extremely high contact pressure is developed at the end of the make-up by virtue of the principles of the contact between convex and concave surfaces. In addition, the accomplishment of the intended alignment of the reference axes of the interengaging surfaces is facilitated because those surfaces substantially have the nature of surfaces of revolution and accordingly resist deviation from their fixed positions relative to each other, which usefully affects the afore-mentioned first seal, that is the seal between the outer surface of the lip of the male member, and the corresponding inner surface of the female member, by reducing the flexure of the lip toward the tubing axis. This has the effect of redistributing and equalizing the sealing pressure over the sealing area of the first seal.

It will be understood from the afore-mentioned principles in the make-up of the threaded coupling that the roles of the end face of the male threaded member and the corresponding face of the female member are very important.

One of the roles that is important is to ensure uniform and high contact pressure (as indicated at 22 in FIG. 3) of the metal-to-metal contact at the end face of the male member. To this end, this contact should be nearly a line contact. Secondly, the lip 11 of the male member should be tough and not flex inwardly or buckle even if the make-up force becomes excessive. Thirdly, upon the striking of the end face of the male member against the mating face of the female member the sealing pressure of the already formed first seal should not be reduced not its uniformity disturbed. Instead, it is desirable that the sealing pressure is increased and its uniformity is improved. The mating faces that can meet the above requirements must be convex and concave surfaces of revolution.

FIG. 1 is a sectional view showing principally a left half of a tube joint for explaining an embodiment of the present invention.

FIG. 2 is an enlarged sectional view of a portion encircled with the dotted line in FIG. 1.

FIGS. 3, 4 and 5 are, respectively, views for explaining the action of the seal pressure at the time of making up a coupling.

Figure 5:
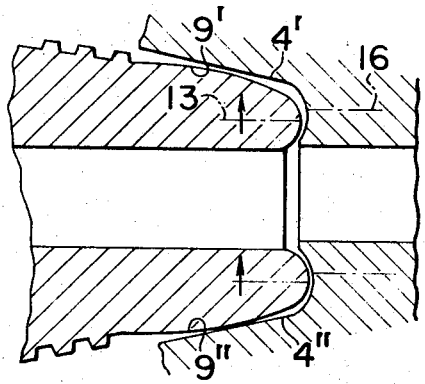

As is most clearly shown in FIG. 2, the thread of the coupling 7 terminates in a non-threaded tapered surface, which covers an axial dimension corresponding to 2 to 3 times the thread pitch, has the same taper as the thread and terminates in turn in a shoulder 6, which is adapted to engage with the end face 5 of the male threaded member. On the other hand, the threaded portion of the male threaded member 1 terminates at its forward end in a lip portion 11, which also covers an axial dimension corresponding to 2 to 3 times the thread pitch. From the ground as will be described hereinafter, the outer surface of the lip 11 has an arcuate profile with a relatively large radius of curvature $R_1$. As is also shown in the same Figure, the end face of the male threaded member having the male thread 2 has a convex arcuate profile with the radius of curvature $R_2$, and the mating shoulder face 6 of the coupling 7, or female threaded member having the female thread 3, has a concave arcuate profile with a radius of curvature $R_3$. The centers of the convex and concave surfaces with respective radii $R_2$ and $R_3$ are located at suitable positions within the male threaded member. In the case of the FIG. 2 structure, the center of the convex surface of $R_2$ is positioned below that of the concave surface of $R_3$, and $R_2$ is preferably no greater than $R_3$.

The outer surface 9 of the lip 11 of the tubing section 1 and the inner taper surface 4 of the coupling 7, both of which approach each other as the male threaded member and female threaded member are interthreaded by the make-up, are adapted to be brought into metal-to-metal contact with each other before the end face 5 of the male threaded member is seated in the mating shoulder face 6 of the female threaded member. To this end, the outer surface 9 of the lip is made spherical with the radius $R_1$ such that its crown is located at a position about midway between the forward end of the male thread and the end of the male threaded member. In this manner, a metal-to-metal contact is first brought about between the thread-free pin and box surfaces 9 and 4, and then a second metal-to-metal contact is produced between the end face 5 of the male threaded member and the mating shoulder face 6 of the female threaded member. With further make-up, the metal-to-metal sealing pressure builds up at a suddenly increased rate, and the sudden increase of the make-up torque can be detected by a torque gauge to automatically stop the make-up operation upon reaching of a predetermined make-up torque, thereby preventing the buckling and plastic deformation of the lip 11.

In the novel joint structure according to the invention, the pitch line 13 of the male threaded member and the pitch line 16 of the female threaded member are perfectly aligned by the application of the make-up force virtue of abutting convex and concave surfaces substantially having the nature of a surface of revolution to prevent deviation from the fixed relative position, so that a firm and powerful metal-to-metal contact between these surfaces 5 and 6 can be ensured. In particular, by setting $R_2$ to be equal to or smaller than $R_3$ a circular line contact can be ensured between these contact surfaces, so that a metal-to-metal seal of an extraordinarily high sealing pressure, can be obtained. Generally, $R_2$ and $R_3$ are suitably 1.0 to 2.5 times the thickness Te of the end of the male threaded member, and $R_1$ is suitably 50 to 300 millimeters. With such values, the second seal, that is, seal 22 at the end of the male threaded member, can be formed as shown in FIG. 3. Further, with a convex or concave surface of revolution at the end face of the lip 5, the lip can withstand excessive make-up forces and will not flex toward the tubing axis (downwardly in connection with FIG. 3) to lose the metal-to-metal seal effect.

Furthermore, the end face of the male threaded member receives reaction force from the mating face of the female threaded member, and this is effective in correcting the nonuniformity of the sealing pressure distribution in the main seal due to machining errors, so that it is possible to obtain a threaded tube joint of a double seal structure having a firmer and more uniform seal. To discuss this respect in more detail, the cutting of the thread and the machining of the seal surface are usually done with different tools. Therefore, there can be more or less discrepancy between the axis of the thread and the axis of the seal surface. The eccentricity between the thread pitch plane 31 and seal surface pitch plane 32 results in nonuniformity of the seal pressure distribution as shown in FIG. 4, which shows an extreme example. In this case, the effective sealing pressure is the minimum contact pressure $P_{min}$. The inner surfaces 4 and 6 of the female member, however, are often machined with the same tool because of their inferior processibility. In such case, it is easy to obtain good alignment of the axes of the thread pitch plane and seal surface pitch plane. Accordingly, the powerful forced contact between the faces 5 and 6 of the male and female members due to the make-up causes automatic displacement of the end 5 of the male member, for instance in the direction of the arrows in FIG. 5, thus increasing the relatively low sealing pressure over the area indicated at 9' and 4' and reducing relatively high sealing pressures over an opposite area as indicated at 9'' and 4''. In this way, the nonuniformity of the sealing pressure distribution as indicated at 33 in FIG. 4 can be automatically corrected, and uniform distribution of the sealing pressure can be ensured.

Still further, by forming a seal film with a thickness of 0.1 to 0.3 millimeter (100 to 300 microns) on the male member end face 5 or female member shoulder face 6 by applying thereto liquid resin such as tetrefluroethylene by means of spraying or with a suitable brush and heating the coating with an infrared heater or other heater to a temperature of 60° to 80°C for a short time, both metal-to-metal contact and metal-to-resin contact can be formed between the faces 5 and 6, thereby increasing the seal area and hence rendering the seal effect more perfect.

Figure 6:
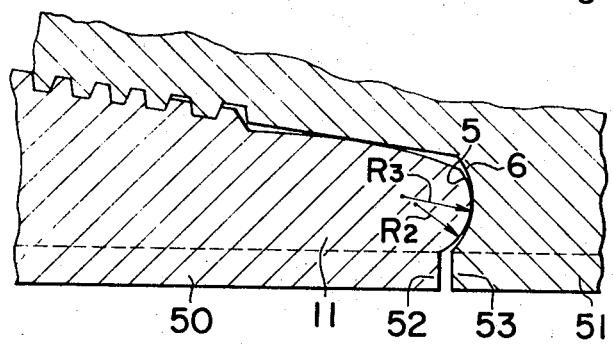
FIGS. 6, 7 and 8 are respectively enlarged sectional views, each showing a different embodiment of the present invention and corresponding to FIG. 2.

FIG. 6 shows another embodiment, which is appliable where the tubing section 1 has a thickness of 8 millimeters or more. It is the same as the preceding embodiment except that the tubing section 1 and coupling 7 have respective inner peripheral portions 50 and 51, whose opposing surfaces 52 and 53 lie in planes normal to the tubing axis, or in conical surfaces.

Figure 7:
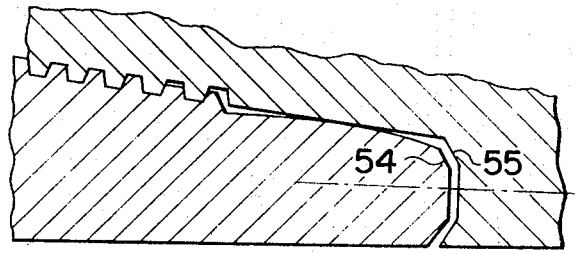

FIG. 7 shows a further embodiment, in which the end face of the male member and the mating face of the female member have respective profiles constituted by a plurality of straight line segments and approximating the arcuate profiles of $R_2$ and $R_3$ in the embodiment of FIG. 2.

Figure 8:
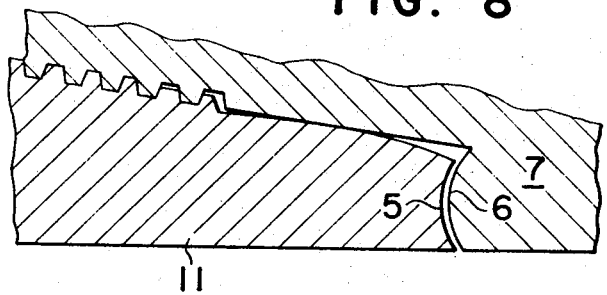

FIG. 8 shows a still further embodiment, in which the end of the male member has a concave face and the mating shoulder of the female member has a convex face.

The embodiments of FIGS. 6 to 8 have the same effect as the embodiment of FIG. 2.

What is claimed is:

1. A threaded tube joint for casing, particularly oil well tubing, including male and female threaded tube members, each having a substantially cylindrical wall and said joint having a structure having:

a first metal-to-metal contact seal formed upon make-up of the joint between an outer surface of a thread-free end portion of the male threaded tube member having a longitudinally extending reference axis within its wall and a corresponding inner surface of the female threaded tube member having a longitudinally extending reference axis within its wall, said outer surface of the male member having a substantially spherical profile, said inner surface of the female member having a straight profile; and a second metal-to-metal contact seal formed also upon make-up of the joint between the end face of the wall of said end portion of the male member and a corresponding face of the wall of the female member, one of said faces of the male and female members substantially having with respect to its reference axis a profile of a convex surface of revolution for aligning the reference axis of the male member with the reference axis of the female member, and the other of said faces of the male and female members substantially having with respect to its reference axis a profile of a concave surface of revolution so as to be complementary to that of the one face.

2. The threaded tube joint of the structure having the first and second seals as claimed in claim 1, wherein the surface of the male member and the mating surface of the female member constituting said second seal have respective radii of curvature $R_2$ and $R_3$, $R_2$ being at least no greater than $R_3$, said radii of curvature both being within a range of 1.0 to 2.5 times the average thickness of said end portion of the male member.

3. The threaded tube joint according to claim 1, wherein one of the interengaging surfaces of said second seal is provided with a coating of such resin material as tetrafluoroethylene.

4. The threaded tube joint according to claim 1, wherein the male and female members are large in wall thickness and have respective inner peripheral portions facing each other at a predetermined gap, the facing surfaces of said inner peripheral portions lying in planes normal to the tubing axis.

5. A threaded tube joint of a structure having the first and second seals as claimed in claim 1, wherein alignment of the male member with the female member by the second seal prevents a flexure of the male member toward the tubing axis, caused by the action of the first seal at the lip of the male member, and equalizes the sealing pressure over the sealing area of the first seal.

6. The threaded tube joint according to claim 1, wherein the interengaging surfaces of said second seal have respective profiles each constituted by a plurality of straight line segments approximating arcuate profiles and each corresponding to the other of said interengaging surfaces.

7. The threaded tube joint according to claim 1, wherein the male and female members are large in wall thickness and have respective inner peripheral portions facing each other with a perdetermined gap between them, the facing surfaces of said inner peripheral portions both lying within complementary conical planes.

* * * * *